United States Patent [19]

Vos et al.

[11] Patent Number: 4,617,945
[45] Date of Patent: Oct. 21, 1986

[54] PROCESS FOR FLAVORING TOBACCO

[75] Inventors: Cornelis Vos; Jan Brasser, both of Huizen, Netherlands

[73] Assignee: Naarden International N.V., Naarden-Bussum, Netherlands

[21] Appl. No.: 507,787

[22] Filed: Jun. 24, 1983

[30] Foreign Application Priority Data

Oct. 14, 1982 [NL] Netherlands .......................... 8203963

[51] Int. Cl.$^4$ ............................................. A24B 15/00
[52] U.S. Cl. .................................. 131/310; 131/309; 131/355; 131/274
[58] Field of Search .............................. 131/274–276, 131/352, 354, 355, 362, 903, 309, 310; 424/DIG. 7, 34; 427/207.1; 426/96, 293

[56] References Cited

U.S. PATENT DOCUMENTS 3,623,489 11/1971 Quinn .................................. 131/274
4,253,473 3/1981 Marmo et al. ...................... 131/275

OTHER PUBLICATIONS

Chem. Abst. #90:19278b, "Pwd. Tob. Flav.", Takemoto et al. (Japanese Pat. No. 78,104,743) 2/1977.
Chem. Abst. #90:19279c, "Gran. Tob. Flav.", Takemoto et al. (Japanese Pat. No. 78,104,742) 2/1977.

Primary Examiner—V. Millin
Assistant Examiner—Gregory Beaucage
Attorney, Agent, or Firm—Michael N. Meller

[57] ABSTRACT

Process for flavoring tobacco by mixing dry cut tobacco with one or more micro-encapsulated flavors as well as with an aqueous adhesive solution containing such quantity of water that said quantity may at least be adsorbed for the most part by the tobacco, continuing the mixing operation till a dry or almost dry product is obtained and then, if necessary, subjecting the obtained product to a drying operation respectively reduction operation.

16 Claims, No Drawings

PROCESS FOR FLAVORING TOBACCO

The invention concerns a process for flavoring tobacco. The invention also comprises the products obtained by the process according to the invention.

Tobacco is mostly flavored before it is made into cigarettes. The most important prior art method of flavoring consists of spraying or atomizing a liquid flavor, sometimes diluted with a suitable solvent e.g. alcohol, over the bulk of the tobacco. The main disadvantage of this method is that the flavor, being very finely dispersed over a large surface area, evaporates rapidly and is susceptible to oxidative deterioration and, consequently, is short lived.

It has been tried to solve this problem using airtight packaging filled with an inert gas, e.g. as described in German Offenlegungsschrift No. 3,006,092. However, this is an expensive solution and the problem reappears as soon as the consumer opens the package.

It has been tried to solve similar problems for tea by using powdered, more specifically micro-encapsulated flavors. However, vibrations and shaking, e.g. during packing and transport, cause the fine powdered flavor to separate from the much coarser tea leaves. Eventually, one part of the package contains mainly powdered flavor and the other part mainly tea leaves. To prevent this separation, granulated flavors, with a particle size comparable to that of tea leaves have been prepared, as described in British Patent No. 1,564,001 and in published British Patent Application, No. 2,074,838. However, granulated flavors have to be prepared in a separate process, using specialized equipment. Although one could envisage similar solutions for the flavoring of tobacco, these would suffer from the same disadvantages.

Thus, there is a need for a process to affix powdered flavors to tobacco. The product of this process should consist only of particles of the original tobacco, some of them being covered with flavor powder.

Such a process, again for tea, has been described in the above mentioned British Patent Application No. 2,074,838, using $\beta$-cyclodextrin/flavor inclusion complexes as the powdered flavors. These molecular complexes, described by W. Saenger in Angew. Chemie 92 (1982) pp. 343-361 are in most cases only poorly soluble in cold water. Therefore, as described in the above mentioned British Patent Application, they may be made into a suspension in water and dispersed on the tea, without suffering from decomposition. However, due to the high price of $\beta$-cyclodextrin, these flavor inclusion complexes are expensive and, consequently, are hardly used in the food industry.

Micro-encapsulated flavors, on the other hand, are extensively used in the food industry, but to date hardly in the tobacco industry. They may be produced in several different ways, e.g. as described by L. L. Balassa and G. O. Fanger in CRC Critical Reviews in Food Technology, July 1971 pp. 245-264.

These microcapsules consist of small droplets of flavor oil with a solid envelope of an edible hydrocolloid, such as a vegetable gum, a modified starch or gelatin.

However, such microcapsules cannot be used in the process described in the British Patent Application mentioned above. Since they are readily soluble in water, they will disintegrate, thereby releasing the flavor oil which is thus subject to evaporation and oxidation.

Surprisingly, a process has now been found to affix micro-encapsulated flavors to cut tobacco with retention of the original appearance of the tobacco. This process comprises the steps of either thoroughly mixing tobacco and micro-encapsulated flavors, followed by finely dividing a solution of an adhesive material in water over the mixture while continuing the mixing operation, or thoroughly mixing the adhesive solution with the vegetable material, immediately followed by the addition of the micro-encapsulated flavor while continuing the mixing operation.

The process also comprises continuing the mixing operation after the three components mentioned above have been added until the mixture is almost dry or completely dry and, if necessary, drying the mixture further with air or an inert gas, which may be warmed if desired.

The quantity of water, added as a solvent for the adhesive, should be sufficient to ensure complete moistening of the tobacco and microcapsules with the adhesive solution. On the other hand, the tobacco should be able to absorb most of the water, to prevent softening or dissolution of the microcapsules to a point where the entrapped flavor oil is released.

Thus, the maximum allowable quantity of water in the adhesive solution also depends on the water absorptive capacity of the tobacco. Tobacco may contain up to 15-18% by weight of water before becoming damp, the exact FIGURE depending on the kind of tobacco and the treatment it has been subjected to before.

In general the quantity of water added should be so limited that after the mixing operation the water content of the mixture is at most 5% by weight in excess of the quantity that may be absorbed by the vegetable material. This residual water is evaporated with air or an inert gas until the mixture has a dry appearance, i.e. until the total water content is 15-18% by weight or less. Preferably the quantity of water should not exceed the FIGURE that can be completely absorbed by the tobacco, thus obviating the need for an additional drying step. The absorptive capacity of any kind of tobacco may be easily determined in moistening and drying experiments in a vacuum desicator. If necessary the absorptive capacity of the tobacco may be increased by predrying.

The amount of microcapsules to be affixed to a given amount of tobacco, using the process of the invention, may vary within wide limits and depends on the desired flavor strength in the end product. The maximum amount that may be affixed is related to the available surface area of the tobacco and is directly proportional to the mean particle size of the microcapsules. Using microcapsules with a mean particle size of 80 $\mu$m, the maximum amount is about 350 g of microcapsules per kg of tobacco. From these data, the maximum amounts for microcapsules with other particle sizes may be derived by simple arithmetic.

In most cases sufficiently high flavor strengths are already attaind with much lower quantities of microcapsules. In many cases it is even simpler and cheaper if only a (small) part of the material to be flavored is subjected to the process of the invention. This flavored part is thereafter mixed with the bulk of unflavored tobacco. If this mixing is done immediately after the flavoring process of the invention, it may obviate the need for a separate drying step, even if the flavored tobacco is not yet completely dry, since the residual water can easily be absorbed by the unflavored bulk.

The adhesives used in the process of the invention may be film forming hydrocolloids, comprising vegetable and microbial gums, such as gum arabic, karaya, tragacanth, carragenan etc.; modified starches, such as dextrines, esterified starches etc.; cellulose derivatives such as hydroxypropylcellulose and carboxymethylcellulose; gletain, casein and comparable proteins and polyvinylalcohol. Alternatively, saccharose and other saccharides which will form a glass on drying may also be used as adhesives. Of course adhesives to be used in the process of the invention must be approved for use in tobacco.

The quantity of adhesive used should be sufficient to secure sufficient adhesion of the microcapsules to the tobacco, and the minimum amount required depends on its adhesive power. Although 1 g of adhesive per kg of microcapsules may be sufficient in some cases, preferably a quantity of 10 g or more per kg of microcapsules should be used to be on the safe side.

In order to secure a homogeneous distribution of the adhesive through the tobacco, it is advantageous to spray or atomize the adhesive solution over the tobacco or the mixture of tobacco and microcapsules. To this end a spray head or atomizer, adjusted in or above the mixing chamber or mixing vessel may be used.

When selecting the hydrocolloid adhesive, it must be taken into account that many of them form highly viscous solutions even in low concentrations. The pressure necessary to disperse a liquid into fine droplets increases with increasing viscosity of that liquid. Solutions with a maximum viscosity of 400 cP may be used on spray heads with a working pressure of 300 Bar. With low pressure spray heads (about 10-15 Bar max.) the viscosity should preferably not exceed 150 cP. However, care should also be taken not to use too diluted solutions to prevent the addition of a quantity of water exceeding the absorptive capacity of the tobacco. Therefore, adhesives causing only a slight viscosity increase in solution, are preferred when a high microcapsules content is desired, to obtain a high flavor strength. Examples of such adhesives are gum arabic and saccharose.

To prevent differences in color between treated and untreated tobacco a suitable food color such as carmel may be added to the adhesive solution.

The process according to the invention may be further improved by spraying a small quantity of water miscible organic solvent over the tobacco or the mixture of tobacco and microcapsules as the case may be, and thoroughly mixing it through, prior to the addition of the adhesive solution. The absorption of water from the adhesive solution by the tobacco is thereby slowed down, resulting in a more homogeneous dispersion of the adhesive solution through the bulk of the mixture. This prevents the formation of conglomerates consisting of particles of tobacco and/or microcapsules, before homogeneous dispersion of the adhesive has occurred.

Suitable solvents have to meet the following conditions: they should not dissolve or only slightly dissolve the microcapsules; they must be suitable for use in tobacco; they should not have an annoying odor or flavor of their own. Examples of such solvents are ethanol, isopropanol, propylene glycol, glycerol and benzyl alcohol.

During the operation of the process of the invention, the organic solvent will partly evaporate and partly be absorbed by the tobacco, thereby limiting the absorptive capacity available for water absorption. The quantity of adhesive solution to be used later should be adapted accordingly. So, the quantity of solvent to be added and the quantity of adhesive solution to be used are interrelated and both depend on the absorptive capacity of the tobacco. Tobacco with a high absorptive capacity may tolerate the addition of up to 100 g of organic solvent per kg of endproduct, especially when that solvent evaporates easily, as is the case with ethanol. However, in most cases 40 g or less per kg end product will suffice to obtain the desired improvement of the process.

The process of the invention may be carried out using mixing equipment which is conventional in the food industry. It is preferred to use a type of mixer which does not cause undue heating of the mixture or damage to the tobacco particles, even on prolonged mixing. In most cases conical mixers are very suitable. When using a mixer which may cause heating or damage the tobacco particles, it may be advantageous to stop the mixing operation before the mixture is dry and thereafter complete drying e.g. with warm air. In order to get a desired particle-size distribution, the product may be passed through a sieve and the remainder ground to the desired particle size.

This is especially appropriate when drying has been completed after the mixing operation, since this may cause the particles to cling together. It may even be necessary to break and grind the product before sifting. However this does not materially affect the appearance of the end product.

EXAMPLE I

In a 10 l Hobart mixer 700 g cut tobacco and 150 g microencapsulated cocoa flavor were mixed in 30 sec., while spraying with 20 g of ethanol. While mixing continued, 50 g of a 14% w/w gum arabic solution was sprayed on the tobacco in about 2 min. and after another 2 min. 80 g gum arabic was added and mixing continued for a few minutes. 1 kg of dry, strongly flavored, cut tobacco was obtained, which was diluted to a flavor level desired for consumption by mixing with 150 kg of fresh tobacco.

EXAMPLE II

In a 100 l conical blender equipped with a doubly rotating screw, 5.8 kg of cut tobacco and 1.2 kg of microencapsulated menthol (menthol content 22 O/O w/w) were mixed during 5 minutes. Using a spray head fitted in the blender, 0.15 kg of ethanol was sprayed over the mixture in about 8 minutes, followed by 0.55 kg of 15 o/o w/w gum arabic solution in about 15 minutes, while continuing the mixing. Thereafter 2.3 kg of tobacco was added and mixing continued for 15 minutes. 10 Kg of strongly menthol flavored tobacco was obtained containing 2.6 o/o menthol. This 10 kg of flavored tobacco was mixed with 65 kg of unflavored tobacco to obtain 75 kg of cigarette tobacco blend containing 0.35 o/o menthol.

We claim:

1. A process for flavoring dry cut tobacco by means of at least one micro-encapsulated flavor, comprising the steps of separately mixing the tobacco with the micro-encapsulated flavor and with an aqueous adhesive solution in an amount sufficient to provide adhesion of the micro-encapsulated flavor to the tobacco and containing such quantity of water that said quantity may at least be substantially absorbed by the tobacco, and continuing the mixing operation till a free-flowing mixture is obtained.

2. The process according to claim 1 wherein the tobacco is first mixed with the micro-encapsulated flavor and then the aqueous adhesive solution is added while continuing the mixing operation.

3. The process according to claim 1, wherein the tobacco is first mixed with the aqueous adhesive solution and then the micro-encapsulated flavor is added while continuing the mixing operation.

4. The process according to claim 1, wherein the quantity of water in the aqueous adhesive solution is such that the water content of the mixture is at most 5% by weight in excess of the quantity that may be absorbed by the tobacco.

5. The process according to claim 1, wherein the quantity of water in the aqueous adhesive solution is equal to or smaller than the quantity that may be absorbed by the tobacco.

6. The process according to claim 1, wherein the micro-encapsulated flavors have a mean particle size of 80 μm and are used in a maximum amount of 0.35 kg per kg of tobacco.

7. The process according to claim 1, wherein the adhesive is at least one product selected from the group consisting of film forming hydrocolloids and sugars which form a glass on drying.

8. The process according to claim 7, wherein the adhesive is at least one product selected from the group consisting of vegetable and microbial gums, modified starch derivatives, cellulose derivatives, gelatin, casein, polyvinylalcohol and saccharose.

9. The process according to claim 8, wherein the adhesive is at least one product selected from the group consisting of gum arabic and saccharose.

10. The process according to claim 1, further comprising the step of subjecting the tobacco to a treatment with a water miscible organic solvent prior to the addition of the aqueous adhesive solution.

11. The process according to claim 10, wherein the water miscible organic solvent is selected from the group consisting of ethanol, isopropanol, propylene glycol, glycerol and benzyl alcohol.

12. The process according to claim 10, wherein at most 100 g organic solvent is used per kg of end product.

13. The process according to claim 12, wherein at most 40 g organic solvent is used per kg of end product.

14. The process according to claim 1, wherein the mixing step is continued until the mixture is completely dry.

15. The process according to claim 1, wherein the free flowing mixture is subjected to a drying step.

16. The process according to claim 1, wherein the free flowing mixture is subjected to a size reduction operation.

* * * * *